(12) United States Patent
Medema et al.

(10) Patent No.: US 10,030,625 B2
(45) Date of Patent: Jul. 24, 2018

(54) DYNAMIC VEHICLE CONTROL SYSTEM

(71) Applicant: General Electric Company, Schenectady, NY (US)

(72) Inventors: Timothy John Medema, Arlington Heights, IL (US); Mikhail Meltser, Buffalo Grove, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/209,782

(22) Filed: Jul. 14, 2016

(65) Prior Publication Data
US 2018/0017032 A1 Jan. 18, 2018

(51) Int. Cl.
*F02N 11/08* (2006.01)

(52) U.S. Cl.
CPC ...... *F02N 11/0837* (2013.01); *F02N 11/0822* (2013.01); *F02N 2200/023* (2013.01); *F02N 2200/061* (2013.01); *F02N 2200/102* (2013.01); *F02N 2200/125* (2013.01)

(58) Field of Classification Search
CPC ............. F02N 11/0837; F02N 11/0822; F02N 2200/023; F02N 2200/102; F02N 2200/061; F02N 2200/125
See application file for complete search history.

(56) References Cited

U.S. PATENT DOCUMENTS

| | | | |
|---|---|---|---|
| 6,650,993 B2 | 11/2003 | Wolf et al. | |
| 6,941,218 B2 | 9/2005 | Wolf et al. | |
| 8,843,419 B2 | 9/2014 | Cooper et al. | |
| 8,924,052 B2 | 12/2014 | Melas et al. | |
| 9,145,863 B2 | 9/2015 | Melster et al. | |
| 2003/0195666 A1* | 10/2003 | Mactavish | B60R 16/0231 701/1 |
| 2005/0027411 A1 | 2/2005 | Meltser et al. | |
| 2008/0082247 A1 | 4/2008 | Hawkins et al. | |
| 2009/0312894 A1 | 12/2009 | Meltser et al. | |
| 2010/0152995 A1 | 6/2010 | Baumann | |
| 2011/0066351 A1 | 3/2011 | Gallagher et al. | |
| 2012/0089537 A1* | 4/2012 | Cooper | B60L 15/32 705/400 |
| 2013/0245925 A1 | 9/2013 | Malone et al. | |
| 2014/0257678 A1 | 9/2014 | Boesch et al. | |

* cited by examiner

*Primary Examiner* — Anne M Antonucci
(74) *Attorney, Agent, or Firm* — GE Global Patent Operation; John A. Kramer (57) ABSTRACT

A control system of a vehicle includes a controller configured to be disposed onboard a first vehicle in a vehicle system formed from the first vehicle and at least a second vehicle. The controller is configured to control deactivation of an engine of the first vehicle based on one or more deactivation settings or limits of the first vehicle. The controller is configured to obtain one or more deactivation settings or limits of the at least the second vehicle and to normalize the one or more deactivation settings or limits of the first vehicle based on the one or more deactivation settings or limits of the at least the second vehicle.

23 Claims, 3 Drawing Sheets

DYNAMIC VEHICLE CONTROL SYSTEM

FIELD

The inventive subject matter described herein relates generally to controllers of vehicles.

BACKGROUND

Some vehicles are equipped with controllers that control at least some operations of the vehicles, such as when propulsion systems of the vehicles automatically shut off or shut down. For example, some rail vehicles include automatic engine start-stop (AESS) systems that automatically shut down engines of the rail vehicles after operations of the rail vehicles remain at or below certain designated limits for extended periods of time. Similarly, some automobiles include start-stop systems that automatically shut down engines of the automobiles after the operations of the automobiles remain at or below certain designated limits for extended periods of time. These types of systems can save fuel and reduce emissions of these vehicles.

Some start-stop systems are customizable in that the limits to which the operations of the vehicles are compared to determine whether and when to shut down the engines of the vehicles can be individually changed for the vehicles. While the individual, customizable settings of the start-stop systems allows for great flexibility, this also can result in inconsistencies between vehicles traveling together in a vehicle system.

For example, in a rail vehicle consist formed from two or more locomotives having AESS systems, the AESS systems onboard different locomotives may shut down the engines of the different locomotives under different operating conditions. One AESS system may shut down the engine of a locomotive after the engine is idling for a first designated period of time, while another AESS system onboard another locomotive in the same rail vehicle consist may shut down the engine of the other locomotive after that engine idles for a shorter, second designated period of time.

The inconsistent settings of the start-stop systems of the vehicles traveling together in a larger vehicle system can cause problems with travel of the vehicle system. The engines of some vehicles may unexpectedly shut down when the settings of the start-stop systems of the vehicles are inconsistent.

BRIEF DESCRIPTION

In one embodiment, a system (e.g., a control system) includes a controller configured to be disposed onboard a first vehicle in a vehicle system formed from the first vehicle and at least a second vehicle. The controller is configured to control deactivation of an engine of the first vehicle based on one or more deactivation settings or limits of the first vehicle. The controller is configured to obtain one or more deactivation settings or limits of the at least the second vehicle and to normalize the one or more deactivation settings or limits of the first vehicle based on the one or more deactivation settings or limits of the at least the second vehicle.

In one embodiment, a method (e.g., a control method) includes obtaining, with a controller, one or more deactivation settings or limits of a first vehicle in a vehicle system formed from the first vehicle and at least a second vehicle. The one or more deactivation settings or limits of the first vehicle are used to control deactivation of an engine of the first vehicle during movement of the vehicle system. The method also includes obtaining, with the controller, one or more deactivation settings or limits of the at least the second vehicle and normalizing, with the controller, the one or more deactivation settings or limits of the first vehicle based on the one or more deactivation settings or limits of the at least the second vehicle.

In one embodiment, a system (e.g., a control system) includes a controller configured to be disposed onboard a first vehicle in a vehicle system formed from the first vehicle and at least a second vehicle. The controller is configured to control operation of an engine of the first vehicle based on one or more settings or limits of the first vehicle. The controller is configured to obtain one or more settings or limits of the at least the second vehicle and to change the one or more settings or limits of the first vehicle to match the one or more settings or limits of the at least the second vehicle.

DETAILED DESCRIPTION

One or more embodiments of the inventive subject matter described herein provide vehicle controllers and methods that automatically shut down or otherwise deactivate engines of vehicles based on deactivation settings and/or limits that are dynamically adjustable. The settings and/or limits may be compared to operations of the vehicles to determine when to deactivate the engines. The settings and/or limits may be dynamically changeable based on the settings and/or limits of one or more other controllers of other vehicles. For example, the controllers may communicate with each other such that the controllers have or use the same settings and/or limits to determine when to automatically shut down engines of the vehicles.

Figure 1:
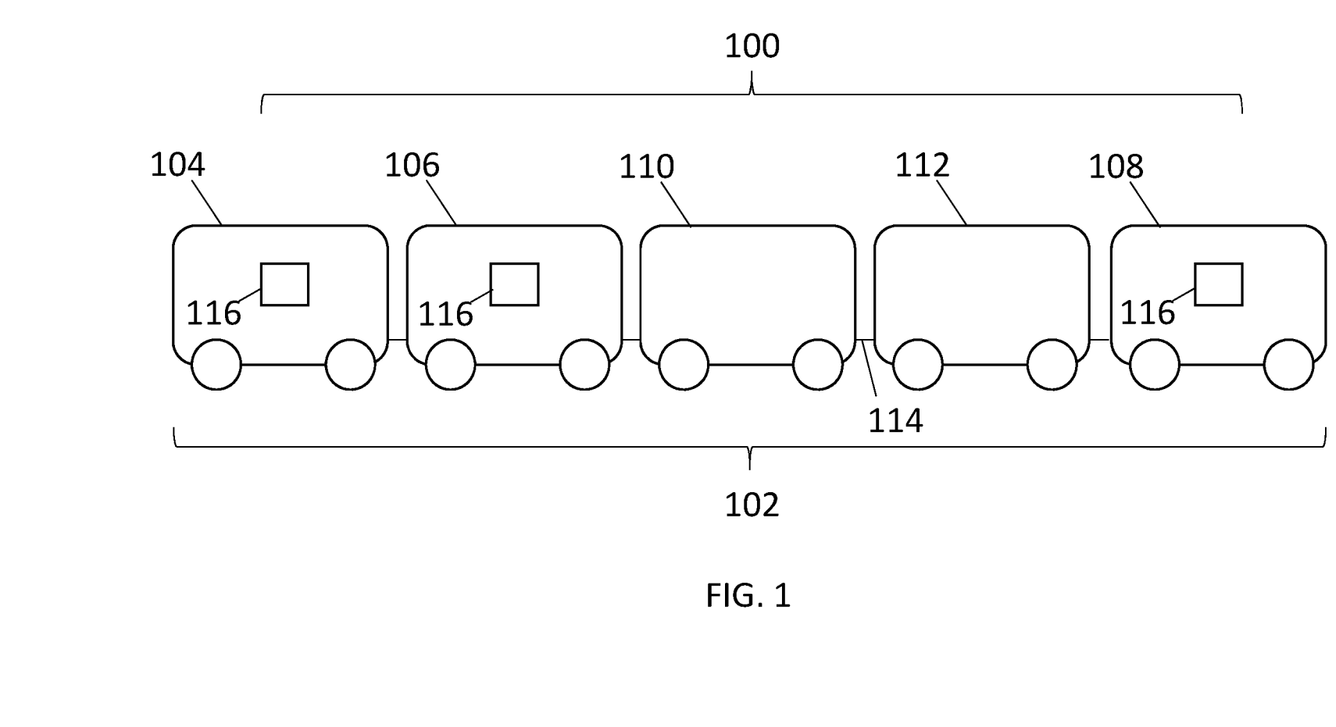
FIG. 1 illustrates one embodiment of a control system of a vehicle system.

FIG. 1 illustrates one embodiment of a control system 100 of a vehicle system 102. The vehicle system 102 includes two or more propulsion-generating vehicles 104, 106, 108. The vehicles 104, 106, 108 may represent locomotives, automobiles, marine vessels, or other vehicles capable of propelling themselves. The vehicle system 102 also includes non-propulsion-generating vehicles 110, 112, such as rail cars, trailers, barges, or the like. Optionally, the vehicle system 102 may not include any non-propulsion-generating vehicles 110, 112. The vehicles in the vehicle system 102 may be mechanically coupled with each other by couplers 114. Alternatively, the vehicles may be detached or separated from each other. The vehicles may be logically coupled by communicating with each other to coordinate individual movements of the vehicles so that the vehicles move together along routes as the vehicle system 102.

The control system 100 includes controllers 116 disposed onboard the vehicles 104, 106, 108. Optionally, the controllers 116 may be off-board the vehicles 104, 106, 108 but can communicate with the vehicles 104, 106, 108. The controllers 116 dictate operations of the vehicles 104, 106, 108. The controller 116 onboard a vehicle can control activation or deactivation of an engine of a propulsion system of the vehicle 104, 106, 108, such as by turning the engine off (with the engine not consuming fuel when off) to deactivate the engine and turning the engine on to activate the engine.

The controllers 116 can deactivate the engines of the vehicles 104, 106, 108 based on deactivation settings and/or limits. As described below, these settings and/or limits can dictate how and/or when the engines of the different vehicles 104, 106, 108 are deactivated. The controllers 116 of the vehicles 104, 106, 108 can communicate with each other to standardize the settings and/or limits used to determine how and/or when the controllers 116 deactivate the engines of the different vehicles 104, 106, 108. The vehicle system 102 may be built or formed from vehicles 104, 106, 108 having different settings and/or limits. As a result, during movement of the vehicle system 102, different vehicles 104, 106, 108 may deactivate the respective engines of the vehicles 104, 106, 108 under different conditions. This increases the complexity of operating the vehicle system 102, and can require increased operator crew training, add to stress on the operator crew, increase fuel consumed, and/or increase emissions generated by the vehicle system 102 (e.g., relative to a vehicle system 102 having standardized settings and limits).

The controllers 116 can communicate with each other in order to reduce or eliminate these differences in settings and/or limits. For example, the controllers 116 can communicate with each other in order to ensure that the controllers 116 are using the same (e.g., standardized) set of settings and/or limits to determine when to deactivate an engine. Responsive to determining that one or more of the controllers 116 are using different settings and/or limits, the controllers 116 may dynamically change or otherwise adapt the settings and/or limits to ensure that all of the controllers 116 in the vehicle system 102 are using the same settings and/or limits.

Figure 2:
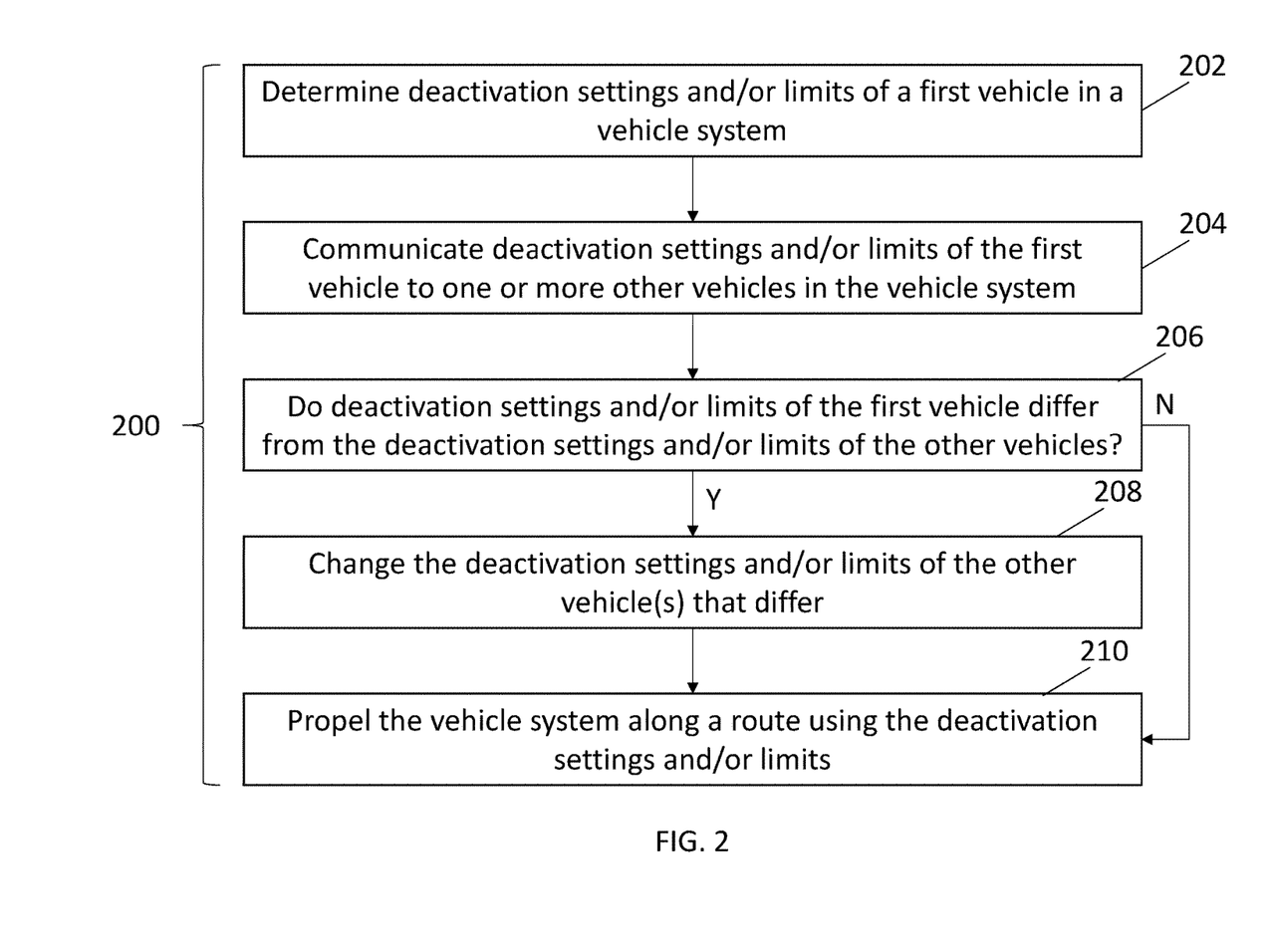
FIG. 2 illustrates a flowchart of one embodiment of a method for dynamically adjusting settings and/or limits used by vehicle controllers.

FIG. 2 illustrates a flowchart of one embodiment of a method 200 for dynamically adjusting settings and/or limits used by vehicle controllers. The method 200 may be performed by one or more of the controllers 116 of the vehicle system 102 shown in FIG. 1. In one embodiment, the method 200 represents software operating on the processors of the controllers 116, or may be used to create such software.

At 202, the deactivation settings and limits of a first vehicle in a vehicle system are determined. For example, the settings and/or limits used by the lead vehicle in a vehicle system can be determined from the controller of the lead vehicle (e.g., in a memory device of or accessible by the controller), may be received from an operator of the lead vehicle, or the like.

The deactivation limits can include pressure set points of a brake system of the vehicle system 102. The set points can dictate when brakes of the vehicles 104, 106, 108 in the vehicle system 102 are activated. For example, responsive to an air pressure in a main reservoir, in a brake pipe, and/or a brake cylinder of an air brake system of the vehicle system 102 dropping below a corresponding set point, the controller 116 may engage the brakes of that vehicle 104, 106, or 108.

The deactivation limits can include a battery charge level. A battery onboard a vehicle 104, 106, 108 may supply current to power one or more propulsion-generating devices or non-propulsion-generating (e.g., auxiliary) devices onboard the vehicle 104, 106, 108. Responsive to the amount of charge in the battery (e.g., the percent of total or full charge, the stored voltage, etc.) dropping below a designated charge limit for a designated, non-instantaneous period of time, the controller 116 of a vehicle 104, 106, 108 may prevent the engine of the same vehicle 104, 106, 108 from turning off or deactivating so that the engine can continue charging the battery. Optionally, responsive to the amount of charge in the battery increasing to or above the designated charge limit for at least the designated, non-instantaneous period of time, the controller 116 of the vehicle 104, 106, 108 may allow the engine of the same vehicle 104, 106, 108 to turn off or deactivate (e.g., based on one or more other operations of the vehicle 104, 106, 108 compared to other limits described herein).

The deactivation limits can include an ambient temperature limit. A sensor onboard a vehicle 104, 106, 108 may measure ambient temperatures of the environment outside of the engine of the vehicle 104, 106, 108 and/or outside the vehicle 104, 106, 108. The controller 116 may restrict the temperatures at which an engine can be deactivated by designating a lower temperature limit. If the ambient temperature is below this limit, then the controller 116 may not allow the engine to be deactivated.

Optionally, the controllers 116 may determine whether to deactivate the engines of the vehicles 104, 106, 108 based on one or more operational settings of the vehicles 104, 106, 108. One example of an operational setting is the designation of a vehicle 104, 106, 108 as a lead or trail vehicle. In the vehicle system 102, one or more of the vehicles 104, 106, 108 may direct operations of one or more other vehicles 104, 106, 108, such as in a distributed power or other arrangement. For example, the vehicle 106 may be a lead vehicle that remotely controls throttle settings and/or brake settings of the vehicles 104 and/or 108 by communicating with the controllers 116 of the vehicles 104, 108. The vehicles 104, 108 may be referred to as trail, trailing, or remote vehicles in that these vehicles 104, 108 are remotely controlled by the vehicle 106. The controllers 116 may not permit the engine of a lead vehicle in such an arrangement to be deactivated, but may allow the engine of a trail vehicle to be deactivated (e.g., based on comparisons of operations of the vehicles to the designated limits described herein).

Another example of an operational setting of the vehicles 104, 106, 108 includes logic settings that restrict when an engine of a vehicle 104, 106, 108 can be deactivated. Some controllers 116 do not allow an engine to be deactivated unless the vehicle 104, 106, 108 is stationary, while other systems 116 may allow for the engine to be deactivated during movement if the vehicle 104, 106, 108 is a trail vehicle.

Another example of an operational setting of the vehicles 104, 106, 108 includes notification settings. The controllers 116 of the vehicles 104, 106, 108 may communicate with output devices, such as electronic displays, speakers, haptic devices, lights, etc., to notify operators of the vehicles 104, 106, 108 of various states, alarm conditions, etc. For example, an alarm may notify an operator onboard the lead vehicle that the controller 116 of a trail vehicle is being modified to change the conditions under which the engine of the trail vehicle is deactivated.

Other examples of operational settings of the vehicles 104, 106, 108 include limits on deactivating the engines of the vehicles 104, 106, 108. The controllers 116 of different vehicles 104, 106, 108 may have different designated time periods that the operations of the vehicles 104, 106, 108 need to be below or above associated limits in order to determine when to deactivate the engines of the vehicles 104, 106, 108. These time periods can be referred to as idle times or idle time periods. For example, one controller 116 may require an engine to idle for at least ten minutes before deactivating the engine while another controller 116 may require an engine to idle for at least thirty minutes before deactivating the engine.

The controllers 116 of different vehicles 104, 106, 108 may have different limits on how long an engine can be deactivated (referred to as deactivation duration limit), how often the same engine can be deactivated (referred to as a deactivation frequency limit) and/or how long of a time period must pass before the same engine can be deactivated again (referred to as a deactivation spacing limit). In one embodiment, the controllers 116 may have different limits on how many times the same engine can be deactivated during a trip of the vehicle 104, 106, 108 from one location (e.g., an originating location) to another location (e.g., a final destination location). This limit can be referred to as a deactivation number limit.

At 204, the deactivation settings and/or limits of the first vehicle are communicated to other vehicles in the vehicle system. The deactivation settings and/or limits may be communicated via one or more wireless and/or wired connections between the vehicles or controllers. For example, the deactivation settings and/or limits may be communicated via a distributed power link, a wireless modem or radio, a dynamic braking modem, a dedicated wireless data line, a dedicated wired line, or an over-the-air software installation (e.g., a wireless download of information from another source).

At 206, a determination is made as to whether the deactivation settings and/or limits of the vehicles differ from each other. For example, the deactivation settings and/or limits of the first vehicle that are received at a different, second vehicle may be compared to each other. If the deactivation settings and/or limits are different for the different vehicles, then the deactivation settings and/or limits of at least one of the vehicles may need to be changed. As a result, flow of the method 200 can proceed toward 208.

Table 1 below illustrates some of the different deactivation settings and/or limits that may be used by the controllers 116 of the vehicles 104, 106, 108 shown in FIG. 1. The settings and/or limits shown in table 1 are some examples, and not all examples, of the settings and/or limits that may be used.

TABLE 1

| Setting/Limit | Vehicle 104 | Vehicle 106 | Vehicle 108 |
| --- | --- | --- | --- |
| Ambient temperature limit | 70 degrees Celsius | 73 degrees Celsius | 80 degrees Celsius |
| Idle time period | 20 minutes | 60 minutes | 35 minutes |
| Deactivation duration limit | 120 minutes | 120 minutes | 150 minutes |
| Deactivation frequency limit | Once per 12 hours | Three times per 24 hours | Once per 24 hours |
| Deactivation spacing limit | 120 minutes | 150 minutes | 150 minutes |

As shown in the table, the controllers 116 of the different vehicles 104, 106, 108 have some different deactivation settings and limits. The controller 116 of the vehicle 104 can receive the deactivation settings and limits of the vehicle 106 (e.g., the second column of the table) and compare the settings and limits to the deactivation settings and limits of the vehicle 104 (e.g., the first column of the table) to determine whether any differences exist. In this example, the vehicles 104, 106 have controllers 116 that operate with different ambient temperature limits, different idle time periods, different deactivation frequency limits, and different deactivation spacing limits. The controller 116 of the vehicle 108 similarly can receive and compare the deactivation settings and limits of the vehicle 106 with the deactivation settings and limits of the vehicle 108 to determine if any differences exist.

At 208, the deactivation settings and/or limits of one or more of the vehicles are changed. The settings and/or limits are changed responsive to differences between the settings and/or limits of different vehicles in the same vehicle system. The settings and/or limits may be changed so that the settings and/or limits are the same for all vehicles. For example, the controllers 116 on non-lead vehicles (or other vehicles) may change the deactivation settings and/or limits so that the trail (or other vehicles) match the deactivation settings and/or limits of the lead vehicle (or another vehicle). Alternatively, the controllers 116 may match the deactivation settings and/or limits to another vehicle or to designated, default values. For example, the controllers 116 may change the deactivation settings and/or limits to designated values that may not be the same as the settings and/or limits for another vehicle.

With respect to the deactivation settings and/or limits shown in Table 1 above, these deactivation settings and/or limits may be changed to the following values shown in Table 2 below:

TABLE 2

| Setting/Limit | Vehicle 104 | Vehicle 106 | Vehicle 108 |
| --- | --- | --- | --- |
| Ambient temperature limit | Previous: 70 degrees Celsius Updated: 73 degrees Celsius | 73 degrees Celsius | Previous: 80 degrees Celsius Updated: 73 degrees Celsius |
| Idle time period | Previous: 20 minutes Updated: 60 minutes | 60 minutes | Previous: 35 minutes Updated: 60 minutes |
| Deactivation duration limit | 120 minutes | 120 minutes | Previous: 150 minutes Updated: 120 minutes |
| Deactivation frequency limit | Previous: Once per 12 hours Updated: Three times per 24 hours | Three times per 24 hours | Previous: Once per 24 hours Updated: Three times per 24 hours |
| Deactivation spacing limit | Previous: 120 minutes Updated: 150 minutes | 150 minutes | 150 minutes |

Table 2 shows the previous values for the deactivation settings and limits of the vehicles 104, 108, as well as the updated values for the deactivation settings and limits. The settings and limits are changed to match those settings and limits of the vehicle 106. Optionally, some settings and/or limits may be changed to match the settings and/or limits for one vehicle, while other settings and/or limits may be changed to match the settings and/or limits for another vehicle in the same vehicle system.

The determination of which vehicle is the lead or other vehicle to which the settings and limits of other vehicles are matched may be designated by an operator of the vehicle system or may be determined in another manner. In one embodiment, the lead or other vehicle to which the settings and limits of other vehicles are matched is determined based on geographic location of the vehicle system. For example, while the vehicle system is in a first geographic area or location, the settings and limits of the vehicles in the vehicle system may be normalized or otherwise matched to the settings and limits of a first vehicle in the vehicle system.

Responsive to exit of the vehicle system from the first geographic area and/or entry of the vehicle system into a different, second geographic area (e.g., where the second area does not overlap the first area), the settings and limits of the vehicles in the vehicle system may be normalized or otherwise matched to the settings and limits of a different, second vehicle in the vehicle system. The selection of which vehicle is used to match the settings and values of other vehicles to in the different areas may be based on operating restrictions in the different areas. For example, some geographic areas (e.g., states, counties, urban areas, etc.) may have stricter limitations on noise, emissions, or the like, of the vehicle system compared to other geographic areas (e.g., other states, other counties, rural areas, etc.). The vehicle selected as the vehicle to which the settings and limits of other vehicles are normalized to may be based on which vehicle has the settings and limits that cause the vehicles in the vehicle system to abide by and not violate the limitations of the geographic area in which the vehicle system is traveling. As the vehicle system travels through different areas having different limitations on noise, emissions, or other operating characteristics of the vehicle system, different vehicles may be selected as the vehicle to which the settings and limits of other vehicles are normalized to.

At 210, the vehicles propel the vehicle system along a route using the deactivation settings and/or limits. For example, the deactivation settings and limits that were changed and the deactivation settings and limits that remained the same for the vehicles are used to determine whether to deactivate engines of the vehicles during movement of the vehicle system. Because the deactivation settings and limits were normalized, the controllers of the vehicles in the same vehicle system use the same settings and limits to determine whether to deactivate the engines.

The settings and limits of one or more vehicles may be normalized and/or de-normalized (e.g., returned to previous values prior to normalizing the settings and limits to match one or more other vehicles) responsive to occurrence of one or more events. For example, prior to coupling (mechanically or logically) the vehicles to travel together along a route, two or more of the vehicles may have non-normalized or individual settings and limits used to determine when and whether to deactivate engines of the vehicles. Responsive to coupling the vehicles (mechanically or logically) together, the settings and limits of one or more of the vehicles may be normalized to the settings and limits used by one or more other vehicles. Responsive to subsequently de-coupling one or more of the vehicles from the vehicles in the vehicle system, the settings and limits of one or more of the vehicles may be de-normalized by returning to the settings and limits used prior to normalization. For example, in a vehicle system having first through fourth propulsion-generating vehicles, the settings and limits used by the vehicles may be normalized responsive to the vehicles being mechanically or logically coupled. Responsive to the fourth vehicle being removed from the vehicle system, the settings and limits used by the fourth vehicle may return to the values used prior to coupling the vehicles. The settings and limits used by the first through third vehicles also may return to the values used prior to coupling the vehicles, or may be normalized again based on the values of the settings and limits of the first through third vehicles, but not based on the settings and limits of the fourth vehicle.

In one embodiment, the determination of whether the settings and limits of a vehicle that is de-coupled from a vehicle system are de-normalized is based on the geographic location of the de-coupled vehicle. For example, in some geographic areas, the settings and limits of the de-coupled vehicle are de-normalized (e.g., return to the values prior to normalization or matching of another vehicle in the vehicle system) while, in other geographic areas, the settings and limits of the de-coupled vehicle are not de-normalized (e.g., do not return to the values prior to normalization or matching of another vehicle in the vehicle system, remain the same, or change to some other default values).

The settings and limits of one or more vehicles may be normalized and/or de-normalized (e.g., returned to previous values prior to normalizing the settings and limits to match one or more other vehicles) responsive to occurrence of one or more events. For example, prior to coupling (mechanically or logically) the vehicles to travel together along a route, two or more of the vehicles may have non-normalized or individual settings and limits used to determine when and whether to deactivate engines of the vehicles. Responsive to coupling the vehicles (mechanically or logically) together, the settings and limits of one or more of the vehicles may be normalized to the settings and limits used by one or more other vehicles. Responsive to subsequently de-coupling one or more of the vehicles from the vehicles in the vehicle system, the settings and limits of one or more of the vehicles may be de-normalized by returning to the settings and limits used prior to normalization. For example, in a vehicle system having first through fourth propulsion-generating vehicles, the settings and limits used by the vehicles may be normalized responsive to the vehicles being mechanically or logically coupled. Responsive to the fourth vehicle being removed from the vehicle system, the settings and limits used by the fourth vehicle may return to the values used prior to coupling the vehicles. The settings and limits used by the first through third vehicles also may return to the values used prior to coupling the vehicles, or may be normalized again based on the values of the settings and limits of the first through third vehicles, but not based on the settings and limits of the fourth vehicle.

While the description herein focuses on deactivation settings and limits, not all embodiments are limited to deactivation settings and limits. Other engine control settings and limits may be normalized so that the vehicles in the same vehicle system operate with the same settings and limits. For example, the injection timings, engine temperatures, air compressor speeds, or other settings and limits of a first vehicle may be communicated to the controllers of other vehicles so that the controllers of the other vehicles change the settings and limits of the other vehicles to match those of the first vehicle.

Figure 3:
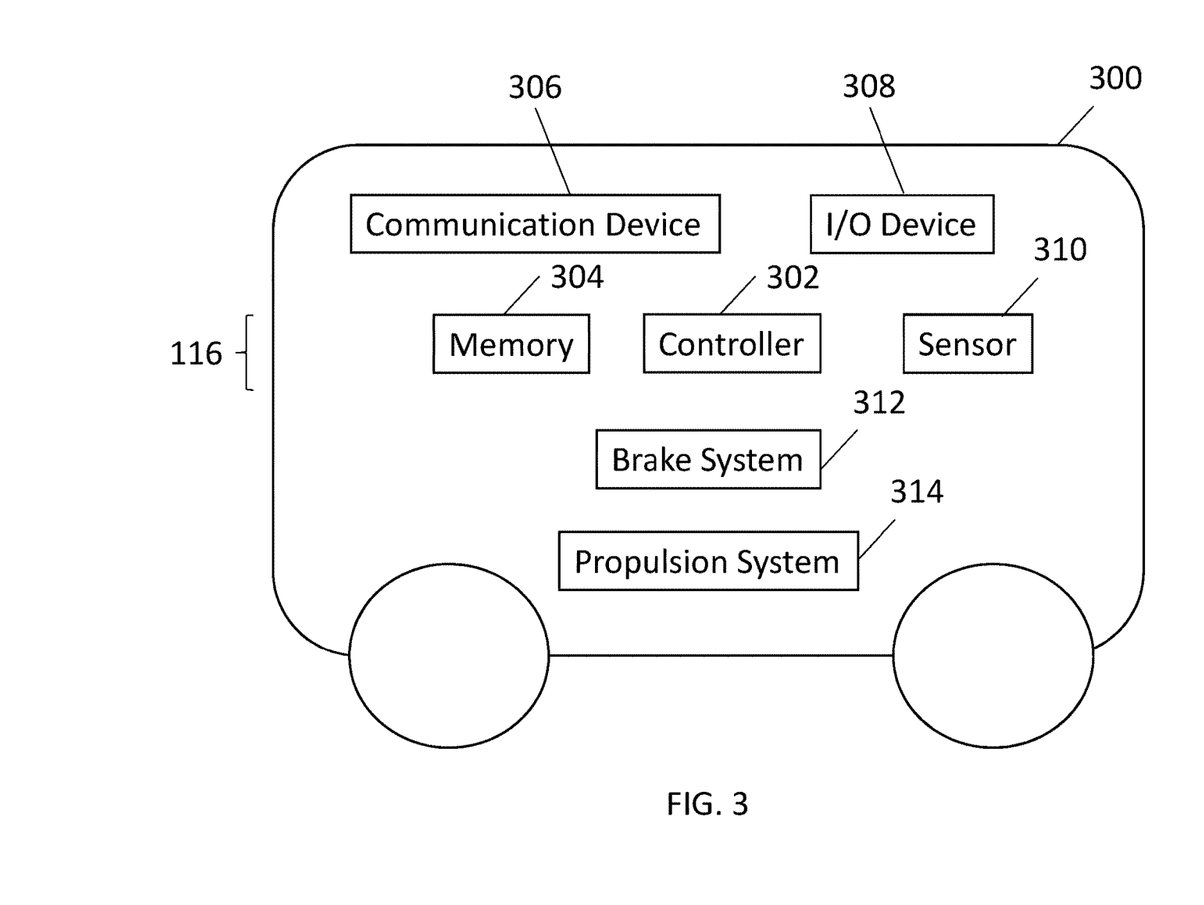
FIG. 3 illustrates one embodiment of a vehicle.

FIG. 3 illustrates one embodiment of a vehicle 300. The vehicle 300 may represent one or more of the vehicles 104, 106, 108 shown in FIG. 1. The vehicle 300 includes a controller 302, which can represent one of the controllers 116 described above in connection with FIGS. 1 and 2. The controller 302 can represents hardware circuitry that includes and/or is connected with one or more processors (e.g., microprocessors, field programmable gate arrays, and/or integrated circuits) that perform at least some of the operations described herein. For example, the controller 302 can determine the deactivation settings and/or limits for the vehicle 300 by accessing the settings and/or limits on a computer readable memory 304 of the controller 116. The memory 304 represents one or more computer hard drives, optical discs, flash drives, etc.

The controller 302 can communicate the deactivation settings and/or limits of the vehicle 300 to one or more other controllers 116 of other vehicles via a communication device 306. The controller 302 optionally can receive the deactivation settings and/or limits of another vehicle via the communication device 306. The communication device 306 represents hardware circuitry that communicates with other controllers 116 via other communication devices 306. For example, the communication device 306 can represent antennas, modems, radios, etc. The controller 302 can compare the deactivation settings and/or limits to determine which settings and/or limits need to be changed, as described above. The controller 302 may change the values of the settings and/or limits to match those of other vehicles, as described herein.

One or more input and/or output devices 308 ("I/O Device" in FIG. 3) receive input from an operator of the vehicle 300 and/or present output to the operator. For example, the input and/or output devices 308 can receive changes to deactivation settings and/or limits, identifications of which vehicle is the lead or trail vehicle in a vehicle system 102, or other information. The input and/or output devices 308 can present output such as the previous and/or updated values of the settings and/or limits, present alarms to an operator, etc. The input and/or output devices 308 can include one or more electronic displays, touchscreens, keyboards, buttons, switches, microphones, etc.

One or more sensors 310 measure characteristic data of the vehicle 300 and provide this data to the controller 302. The sensors 310 can include pressure transducers or other pressure-sensitive devices that measure pressures of a brake system 312 of the vehicle 300, which can represent air reservoirs, brake cylinders, brake pipes, etc., of the vehicle 300. The sensors 310 can include thermometers, thermocouples, or other temperature-sensitive devices that measure ambient temperatures or other temperatures. The sensors 310 can include one or more clocks or other devices that track passage of time. Optionally, the sensors 310 can measure one or more other characteristics. A propulsion system 314 of the vehicle 300 represents the devices or components that propel the vehicle 300. The propulsion system 314 can represent one or more engines, alternators, generators, motors, or the like. As described above, the engine of the propulsion system 314 can be deactivated based on the deactivation settings and/or limits of the vehicle 300 that are dynamically altered to match those of other vehicles in the same vehicle system 102.

In one embodiment, a system (e.g., a control system) includes a controller configured to be disposed onboard a first vehicle in a vehicle system formed from the first vehicle and at least a second vehicle. The controller is configured to control deactivation of an engine of the first vehicle based on one or more deactivation settings or limits of the first vehicle. The controller is configured to obtain one or more deactivation settings or limits of the at least the second vehicle and to normalize the one or more deactivation settings or limits of the first vehicle based on the one or more deactivation settings or limits of the at least the second vehicle.

In one example, the controller can be configured to normalize the one or more deactivation settings or limits of the first vehicle by changing a value of the one or more deactivation settings or limits of the first vehicle to match a value of the one or more deactivation settings or limits of the at least the second vehicle. This normalization may occur automatically, such as without intervention or action of an operator. The controller can be configured to normalize the one or more deactivation settings or limits of the first vehicle based on the one or more deactivation settings or limits of the at least the second vehicle such that all vehicles in the vehicle system operate using the same deactivation settings or limits. The controller optionally is configured to, responsive to operation of the first vehicle falling below one or more of the deactivation limits of the first vehicle that are normalized, deactivate the engine of the first vehicle during movement of the vehicle system.

The one or more deactivation settings or limits of the first vehicle may include one or more pressure set points of a brake system of the first vehicle that dictate when the brake system engages. Optionally, the one or more deactivation settings or limits of the first vehicle include a battery charge level of a battery onboard the first vehicle that dictate when the engine of the first vehicle can be deactivated. In another example, the one or more deactivation settings or limits of the first vehicle can include an ambient temperature limit on when the engine of the first vehicle can be deactivated, one or more of an idle time period that the engine idles before deactivating the engine, a deactivation duration limit on how long the engine can remain deactivated, a deactivation frequency limit on how often the engine can be deactivated, and/or a deactivation spacing limit on how long of a time period between consecutive deactivations of the engine.

In one embodiment, a method (e.g., a control method) includes obtaining, with a controller, one or more deactivation settings or limits of a first vehicle in a vehicle system formed from the first vehicle and at least a second vehicle. The one or more deactivation settings or limits of the first vehicle are used to control deactivation of an engine of the first vehicle during movement of the vehicle system. The method also includes obtaining, with the controller, one or more deactivation settings or limits of the at least the second vehicle and normalizing, with the controller, the one or more deactivation settings or limits of the first vehicle based on the one or more deactivation settings or limits of the at least the second vehicle.

In one example, normalizing the one or more deactivation settings or limits of the first vehicle can include changing a value of the one or more deactivation settings or limits of the first vehicle to match a value of the one or more deactivation settings or limits of the at least the second vehicle. Optionally, normalizing the one or more deactivation settings or limits of the first vehicle occurs based on the one or more deactivation settings or limits of the at least the second vehicle such that all vehicles in the vehicle system operate using the same deactivation settings or limits. The normalization (and/or de-normalization) can occur automatically (e.g., without operator intervention or action). The method additionally or alternatively can include deactivating the engine of the first vehicle during movement of the vehicle system responsive to operation of the first vehicle falling below one or more of the deactivation limits of the first vehicle that are normalized.

The one or more deactivation settings or limits of the first vehicle can include one or more pressure set points of a brake system of the first vehicle that dictate when the brake system engages, a battery charge level of a battery onboard the first vehicle that dictate when the engine of the first vehicle can be deactivated, an ambient temperature limit on when the engine of the first vehicle can be deactivated, an idle time period that the engine idles before deactivating the engine, a deactivation duration limit on how long the engine can remain deactivated, a deactivation frequency limit on how often the engine can be deactivated, and/or a deactivation spacing limit on how long of a time period between consecutive deactivations of the engine.

In one embodiment, a system (e.g., a control system) includes a controller configured to be disposed onboard a first vehicle in a vehicle system formed from the first vehicle and at least a second vehicle. The controller is configured to control operation of an engine of the first vehicle based on one or more settings or limits of the first vehicle. The controller is configured to obtain one or more settings or limits of the at least the second vehicle and to change the one or more settings or limits of the first vehicle to match the one or more settings or limits of the at least the second vehicle.

Optionally, the controller can be configured to, responsive to operation of the first vehicle falling below one or more of the limits of the first vehicle that are changed, deactivate the engine of the first vehicle during movement of the vehicle system. The one or more settings or limits of the first vehicle may include one or more of a pressure set point of a brake system of the first vehicle that dictate when the brake system engages, a battery charge level of a battery onboard the first vehicle that dictate when the engine of the first vehicle can be deactivated, an ambient temperature limit on when the engine of the first vehicle can be deactivated, an idle time period that the engine idles before deactivating the engine, a deactivation duration limit on how long the engine can remain deactivated, a deactivation frequency limit on how often the engine can be deactivated, and/or a deactivation spacing limit on how long of a time period between consecutive deactivations of the engine.

The controller optionally can be configured to automatically obtain the one or more settings or limits of the at least the second vehicle, over a communication device of the vehicle system, responsive to the first vehicle being coupled with the at least the second vehicle. The controller can be configured to change the one or more settings or limits of the first vehicle to match the one or more settings or limits of the at least the second vehicle responsive to a determination that the at least the second vehicle is a designated lead vehicle of the vehicle system. The controller can be configured to change the one or more settings or limits of the first vehicle back to original settings or limits of the first vehicle, which were prior to the one or more settings or limits of the first vehicle having been changed to match the one or more settings or limits of the at least the second vehicle, responsive to the first vehicle being de-coupled from the at least the second vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions, numerical values, and types of materials described herein are intended to define the parameters of the inventive subject matter, they are by no means limiting and are exemplary embodiments. Many other embodiments will be apparent to persons of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The methods described herein may be performed using one or more tangible and non-transitory components, such as one or more processors, controllers, computers, or other devices. The operations described in connection with the methods may be directed by one or more sets of instructions stored on a tangible and non-transitory computer readable medium. For example, software code stored on a tangible and non-transitory memory may be used to direct one or more processors to carry out the operations of the methods.

This written description uses examples to disclose several embodiments of the inventive subject matter and also to enable a person of ordinary skill in the art to practice the embodiments of inventive subject matter, including making and using any devices or systems and performing any incorporated methods. The patentable scope of the inventive subject matter is defined by the claims, and may include other examples that occur to persons of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a controller configured to be disposed onboard a first vehicle in a vehicle system formed from the first vehicle and at least a second vehicle, the controller configured to control deactivation of an engine of the first vehicle based on one or more deactivation settings or limits of the first vehicle, wherein responsive to the first vehicle and the second vehicle being coupled for coordinated movement together along a route, the controller is configured to obtain one or more deactivation settings or limits of the at least the second vehicle and to normalize the one or more deactivation settings or limits of the first vehicle based on the one or more deactivation settings or limits of the at least the second vehicle,
and wherein the controller is configured to change the one or more deactivation settings or limits of the first vehicle back to original settings or limits of the first vehicle, which were prior to the one or more deactivation settings or limits of the first vehicle having been normalized based on the one or more deactivation settings or limits of the at least the second vehicle, responsive to the first vehicle being de-coupled from the second vehicle.

2. The system of claim 1, wherein the controller is configured to normalize the one or more deactivation settings or limits of the first vehicle by changing a value of the one or more deactivation settings or limits of the first vehicle to match a value of the one or more deactivation settings or limits of the at least the second vehicle.

3. The system of claim 1, wherein the controller is configured to normalize the one or more deactivation settings or limits of the first vehicle based on the one or more deactivation settings or limits of the at least the second vehicle such that all vehicles in the vehicle system operate using the same deactivation settings or limits.

4. The system of claim 1, wherein the controller is configured to, responsive to operation of the first vehicle falling below one or more of the deactivation limits of the first vehicle that are normalized, deactivate the engine of the first vehicle during movement of the vehicle system.

5. The system of claim 1, wherein the one or more deactivation settings or limits of the first vehicle include one or more pressure set points of a brake system of the first vehicle that dictate when the brake system engages.

6. The system of claim 1, wherein the one or more deactivation settings or limits of the first vehicle include a battery charge level of a battery onboard the first vehicle that dictate when the engine of the first vehicle can be deactivated.

7. The system of claim 1, wherein the one or more deactivation settings or limits of the first vehicle include an ambient temperature limit on when the engine of the first vehicle can be deactivated.

8. The system of claim 1, wherein the one or more deactivation settings or limits of the first vehicle include one or more of an idle time period that the engine idles before deactivating the engine, a deactivation duration limit on how long the engine can remain deactivated, a deactivation frequency limit on how often the engine can be deactivated, or a deactivation spacing limit on how long of a time period between consecutive deactivations of the engine.

9. The system of claim 1, wherein the first vehicle and the second vehicle are logically coupled for coordinated movement together along the route.

10. The system of claim 1, wherein the controller is configured to normalize the one or more deactivation settings or limits of the first vehicle based on the one or more deactivation settings or limits of the at least the second vehicle responsive to both the first vehicle and the second vehicle being coupled for coordinated movement together along the route and a determination that the second vehicle is a designated lead vehicle of the vehicle system.

11. A method comprising:
obtaining, with a controller, one or more deactivation settings or limits of a first vehicle in a vehicle system formed from the first vehicle and at least a second vehicle, the one or more deactivation settings or limits of the first vehicle used to control deactivation of an engine of the first vehicle during movement of the vehicle system;
responsive to the first vehicle and the second vehicle being coupled for coordinated movement together along a route:
obtaining, with the controller, one or more deactivation settings or limits of the at least the second vehicle; and
normalizing, with the controller, the one or more deactivation settings or limits of the first vehicle based on the one or more deactivation settings or limits of the at least the second vehicle; and
responsive to the first vehicle being de-coupled from the second vehicle, changing, with the controller, the one or more deactivation settings or limits of the first vehicle back to original settings or limits of the first vehicle, which were prior to the one or more deactivation settings or limits of the first vehicle having been normalized based on the one or more deactivation settings or limits of the at least the second vehicle.

12. The method of claim 11, wherein normalizing the one or more deactivation settings or limits of the first vehicle includes changing a value of the one or more deactivation settings or limits of the first vehicle to match a value of the one or more deactivation settings or limits of the at least the second vehicle.

13. The method of claim 11, wherein normalizing the one or more deactivation settings or limits of the first vehicle occurs based on the one or more deactivation settings or limits of the at least the second vehicle such that all vehicles in the vehicle system operate using the same deactivation settings or limits.

14. The method of claim 11, further comprising deactivating the engine of the first vehicle during movement of the vehicle system responsive to operation of the first vehicle falling below one or more of the deactivation limits of the first vehicle that are normalized.

15. The method of claim 11, wherein the one or more deactivation settings or limits of the first vehicle include one or more pressure set points of a brake system of the first vehicle that dictate when the brake system engages.

16. The method of claim 11, wherein the one or more deactivation settings or limits of the first vehicle include a battery charge level of a battery onboard the first vehicle that dictate when the engine of the first vehicle can be deactivated.

17. The method of claim 11, wherein the one or more deactivation settings or limits of the first vehicle include an ambient temperature limit on when the engine of the first vehicle can be deactivated.

18. The method of claim 11, wherein the one or more deactivation settings or limits of the first vehicle include one or more of an idle time period that the engine idles before deactivating the engine, a deactivation duration limit on how long the engine can remain deactivated, a deactivation frequency limit on how often the engine can be deactivated, or a deactivation spacing limit on how long of a time period between consecutive deactivations of the engine.

19. A system comprising:
a controller configured to be disposed onboard a first vehicle in a vehicle system formed from the first vehicle and at least a second vehicle, the controller configured to control operation of an engine of the first vehicle based on one or more settings or limits of the first vehicle, wherein the controller is configured to obtain one or more settings or limits of the at least the second vehicle and to change the one or more settings or limits of the first vehicle to match the one or more settings or limits of the at least the second vehicle; wherein:
the controller is configured to automatically obtain the one or more settings or limits of the at least the second vehicle, over a communication device of the vehicle system, responsive to the first vehicle being coupled with the at least the second vehicle;
the controller is configured to change the one or more settings or limits of the first vehicle to match the one or more settings or limits of the at least the second vehicle responsive to a determination that the at least the second vehicle is a designated lead vehicle of the vehicle system; and
the controller is configured to change the one or more settings or limits of the first vehicle back to original settings or limits of the first vehicle, which were prior to the one or more settings or limits of the first vehicle having been changed to match the one or more settings or limits of the at least the second vehicle, responsive to the first vehicle being de-coupled from the at least the second vehicle.

20. The system of claim 19, wherein the controller is configured to, responsive to operation of the first vehicle falling below one or more of the limits of the first vehicle that are changed, deactivate the engine of the first vehicle during movement of the vehicle system.

21. The system of claim 19, wherein the one or more settings or limits of the first vehicle include one or more of a pressure set point of a brake system of the first vehicle that dictate when the brake system engages, a battery charge level of a battery onboard the first vehicle that dictate when the engine of the first vehicle can be deactivated, or an ambient temperature limit on when the engine of the first vehicle can be deactivated.

22. The system of claim 19, wherein the one or more settings or limits of the first vehicle include one or more of an idle time period that the engine idles before deactivating the engine, a deactivation duration limit on how long the engine can remain deactivated, a deactivation frequency limit on how often the engine can be deactivated, or a deactivation spacing limit on how long of a time period between consecutive deactivations of the engine.

23. A system comprising:
   a controller configured to be disposed onboard a first vehicle in a vehicle system formed from the first vehicle and at least a second vehicle, the controller configured to control operation of an engine of the first vehicle based on one or more settings or limits of the first vehicle,
   wherein the controller is configured, responsive to the first vehicle being coupled with the second vehicle for coordinated movement together along a route, to obtain one or more settings or limits of the second vehicle and to change the one or more settings or limits of the first vehicle to match the one or more settings or limits of the second vehicle; and
   wherein the controller is configured to change the one or more settings or limits of the first vehicle back to original settings or limits of the first vehicle, which were prior to the one or more settings or limits of the first vehicle having been changed to match the one or more settings or limits of the second vehicle, responsive to the first vehicle being de-coupled from the second vehicle.

* * * * *